United States Patent
Ko et al.

(10) Patent No.: US 8,718,192 B2
(45) Date of Patent: May 6, 2014

(54) APPARATUS AND METHOD FOR GENERATING EFFECTIVE SIGNAL TO NOISE RATIO PER STREAM IN A MULTIPLE INPUT MULTIPLE OUTPUT WIRELESS COMMUNICATION SYSTEM

(75) Inventors: Eun-Seok Ko, Suwon-si (KR); Yung-Soo Kim, Seongnam-si (KR); Myeon-Kyun Cho, Seongnam-si (KR); In-Soo Hwang, Yongin-si (KR); Vahid Tarokh, Cambridge, MA (US)

(73) Assignee: Samsung Electronics Co., Ltd (KR)

( * ) Notice: Subject to any disclaimer, the term of this patent is extended or adjusted under 35 U.S.C. 154(b) by 1070 days.

(21) Appl. No.: 12/166,750

(22) Filed: Jul. 2, 2008

(65) Prior Publication Data

US 2009/0010349 A1    Jan. 8, 2009

(30) Foreign Application Priority Data

Jul. 4, 2007    (KR) .............................. 2007-0066858

(51) Int. Cl.
*H03K 9/00*        (2006.01)
(52) U.S. Cl.
USPC ......................................... 375/316; 375/267
(58) Field of Classification Search
CPC ....... H04L 1/06; H04L 1/0003; H04L 1/0009; H04L 24/2647
USPC ......... 375/260, 316, 347, 227, 262, 267, 341, 375/346; 709/226; 370/329; 455/69
See application file for complete search history.

(56) References Cited

U.S. PATENT DOCUMENTS

| | | | |
|---|---|---|---|
| 7,477,699 B2 * | 1/2009 | Wang et al. ................... | 375/267 |
| 7,702,050 B2 * | 4/2010 | Su ................................. | 375/347 |
| 7,885,228 B2 * | 2/2011 | Walton et al. ................. | 370/329 |
| 2006/0018397 A1 * | 1/2006 | Sampath et al. .............. | 375/267 |
| 2006/0205357 A1 * | 9/2006 | Kim ............................... | 455/69 |
| 2006/0256848 A1 * | 11/2006 | Medvedev et al. ............ | 375/227 |
| 2007/0116143 A1 * | 5/2007 | Bjerke et al. .................. | 375/262 |
| 2007/0198719 A1 * | 8/2007 | Su et al. ........................ | 709/226 |

FOREIGN PATENT DOCUMENTS

KR    1020040009620    1/2004

* cited by examiner

*Primary Examiner* — Daniel Washburn
*Assistant Examiner* — Fitwi Hailegiorgis
(74) *Attorney, Agent, or Firm* — The Farrell Law Firm, P.C.

(57) ABSTRACT

An apparatus and method for generating an effective Signal to Noise Ratio (SNR) per stream in a Multiple Input Multiple Output (MIMO) wireless communication system is disclosed. The apparatus includes a selector, a calculator, a generator, and a decider. The selector selects effective streams among whole streams. The calculator calculates a relative SNR rate between the effective streams. The generator generates an equation having as a solution an SNR of a first effective stream. The decider decides an SNR per effective stream using the solution of the equation and the relative SNR rate.

24 Claims, 3 Drawing Sheets

APPARATUS AND METHOD FOR GENERATING EFFECTIVE SIGNAL TO NOISE RATIO PER STREAM IN A MULTIPLE INPUT MULTIPLE OUTPUT WIRELESS COMMUNICATION SYSTEM

PRIORITY

This application claims priority under 35 U.S.C. §119(a) to a Korean Patent Application filed in the Korean Intellectual Property Office on Jul. 4, 2007 and assigned Serial No. 2007-66858, the contents of which are herein incorporated by reference.

BACKGROUND OF THE INVENTION

1. Field of the Invention

The present invention relates generally to a Multiple Input Multiple Output (MIMO) wireless communication system, and in particular, to an apparatus and method for generating an effective Signal to Noise Ratio (SNR) per stream for a Maximum Likelihood (ML) detection technique in the MIMO wireless communication system.

2. Description of the Related Art

With the recent increase in the demand for high-speed and high-quality data transmission, much attention is being paid to a MIMO wireless communication system using a plurality of transmit/receive antennas that is one of the technologies that may satisfy the demand. By performing a communication using a plurality of streams through a plurality of antennas, the MIMO technology can greatly improve a channel capacity compared to a single antenna. For example, a mean channel capacity increases 'M' times compared to a single antenna if transmit/receive ends all use transmission/receive antennas of an 'M' number, channels between the respective antennas are independent from each other, and the bandwidth and the whole transmission power are fixed.

In a MIMO system, various detection techniques for detecting a desired signal among signals mixed and received through a plurality of receive antennas have been proposed. Among the various detection techniques, the Maximum Likelihood (ML) detection technique has the best performance. In general, a linear scheme such as a Minimum Mean Square Error (MMSE) detection technique provides a diversity gain less than the number of receive antennas, while the ML detection technique guarantees as many diversity gains as the number of receive antennas the MIMO system has. However, because the ML detection technique is highly complicated, it is difficult to actually apply the technique despite its optimal performance.

In recent years, research for alternative techniques having performances nearly as good as the ML detection technique while reducing the operation complexity are in progress. As a result, various alternative techniques have been proposed. For example, QR decomposition-Modified Maximum Likelihood Detector (QRM-MLD), Recursive Modified Maximum Likelihood (RMML), and Sorted-RMML (S-RMML) techniques have been proposed. However, the listed techniques relate to an Open-Loop (OL) MIMO technology that does not consider how to utilize feedback information of a receive end. Similarly, the previous research does not consider how to create the feedback information. Thus, in order to apply the ML detection technique to a Close-Loop (CL) MIMO technology, there is needed an alternative for generating feedback information suitable to the ML detection technique.

SUMMARY OF THE INVENTION

An aspect of the present invention is to substantially solve at least the above problems and/or disadvantages and to provide at least the advantages below. Accordingly, one aspect of the present invention is to provide an apparatus and method for generating feedback information for a Maximum Likelihood (ML) detection technique in a Multiple Input Multiple Output (MIMO) wireless communication system.

Another aspect of the present invention is to provide an apparatus and method for generating an effective Signal to Noise Ratio (SNR) per stream for an ML detection technique in a MIMO wireless communication system.

The above aspects are achieved by providing an apparatus and method for generating an effective SNR per stream in a MIMO wireless communication system.

According to one aspect of the present invention, a receive end apparatus in a Multiple Input Multiple Output (MIMO) wireless communication system is provided. The apparatus includes a selector, a calculator, a generator, and a decider. The selector selects effective streams among whole streams. The calculator calculates a relative Signal to Noise Ratio (SNR) rate between the effective streams. The generator generates an equation having as a solution an SNR of a first effective stream that is one of the effective streams. The decider decides an SNR per effective stream using the solution of the equation and the relative SNR rate.

According to another aspect of the present invention, an operation method of a receive end in a MIMO wireless communication system is provided. The method includes selecting effective streams among whole streams, calculating a relative Signal to Noise Ratio (SNR) rate between the effective steams, generating an equation having as a solution an SNR of a first effective stream that is one of the effective streams, and deciding an SNR per effective stream using the solution of the equation and the relative SNR rate.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
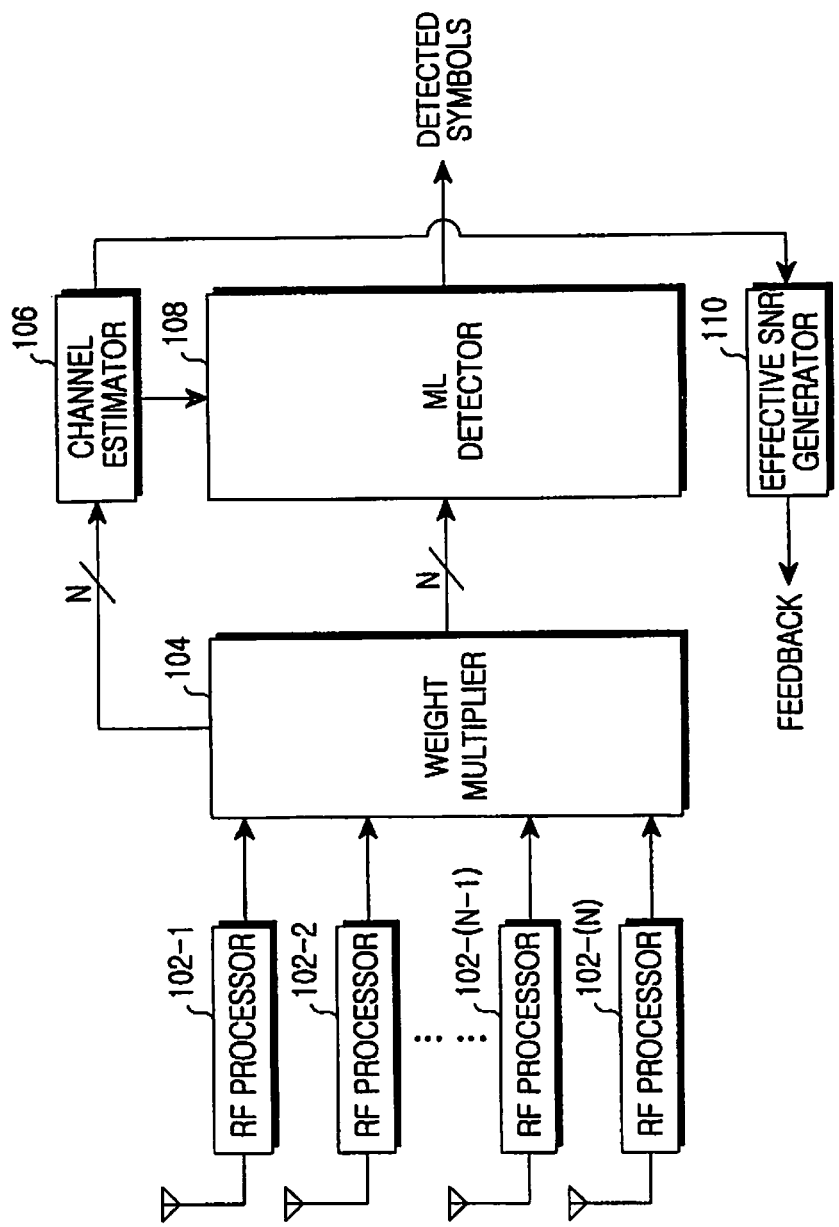
FIG. 1 is a block diagram illustrating a construction of a receive end in a Multiple Input Multiple Output (MIMO) wireless communication system according to a preferred embodiment of the present invention.

Preferred embodiments of the present invention will be described herein below with reference to the accompanying drawings. In the following description, well-known functions or constructions are not described in detail since they would obscure the invention in unnecessary detail.

A technique for generating an effective Signal to Noise Ratio (SNR) per stream for a Maximum Likelihood (ML) detection technique in a Multiple Input Multiple Output (MIMO) wireless communication system according to a preferred embodiment of the present invention is described below.

First, it is assumed that a transmit end has transmit antennas of an $N_T$ number and a receive end has receive antennas of an $N_R$ number. $N_{T,eff}$ denotes the number of effective streams actually used among $N_T$ transmissible streams. $N_{T,eff}$ is less than or equal to $N_T$. Further, s denotes a symbol vector having a $N_{T,eff} \times 1$ size and transmitted through the $N_{T,eff}$ streams. $M_{TX}$(m) denotes a modulation order of a symbol transmitted through an $m^{th}$ element, that is, an $m^{th}$ stream of the symbol vector s.

A relationship between a transmitted signal of the transmit end and a received signal of the receive end is expressed in Equation 1 below:

$$r = W_R H W_T P_T s + n \quad (1)$$
$$= H_{eff} s + n$$

Wherein, r denotes the received signal vector, $W_R$ denotes the reception weight matrix, H denotes the channel matrix, $W_T$ denotes the transmission weight matrix for precoding or beamforming, $P_T$ denotes the diagonal matrix allocating transmission power, s denotes the transmitted signal vector, n denotes the noise vector, and $H_{eff}$ denotes the effective channel matrix.

The receive end calculates a Euclidean distance between a received signal vector and each of the transmissible signal vectors and estimates a signal vector having the minimum Euclidean distance as a transmitted signal vector. A signal detection operation of the receive end can be expressed in Equation 2 below:

$$\hat{s} = \min_{\hat{s} \in S_{set}} \|r - \hat{H}_{eff} \hat{s}\|^2 \quad (2)$$

Wherein, ŝ denotes the estimated transmitted signal vector, $S_{set}$ denotes the transmissible symbol vector set, r denotes the received signal vector, $\hat{H}_{eff}$ denotes the estimated effective channel matrix, and $\|\cdot\|^2$ denotes the vector 2-norm operator.

The transmissible symbol vector set is decided depending on a modulation order per stream. For example, if $N_{T,eff}$ is equal to '2' and $M_{TX}(1)$ and $M_{TX}(2)$ are based on Binary Phase Shift Keying (BPSK), the $S_{set}$ is comprised of the vector set $\{[1,1]^T, [1,-1]^T, [-1,1]^T, [-1,-1]^T\}$. One of the elements of the $S_{set}$ is detected as a final transmitted signal vector according to Equation 2. That is, as shown in Equation 2, the ML detection technique does not detect a signal per stream, but treats a symbol vector as one unit to detect a signal.

This feature of the ML detection technique causes a problem of generating an effective SNR per stream. In order to provide a solution to the problem, the present invention computes an effective SNR per stream on the basis of a relationship between a channel capacity and the effective SNR per stream.

Accordingly, the number of effective streams is decided using a channel capacity equation and an effective channel matrix through the following process. First, a plurality of effective channel matrices are generated according to a number of effective streams. For example, if the number of whole streams is equal to '4' and the number of effective streams is equal to '1', there are four cases where a first, a second, a third, or a fourth stream is selected. In the following description, $H_{eff}^T$ denotes an effective channel matrix if the number of effective streams is equal to the whole stream number, and $H_{N_{T,eff}}(l)$ denotes an effective channel matrix that is reconstructed according to the effective streams using the $H_{eff}^T$, wherein l refers to an index representing each of possible stream combinations for a corresponding number that is greater than or equal to '1' and is less than or equal to ${}_{N_T}C_{N_{T,eff}}$, ${}_aC_b$ (a Combination b) refers to the number of combinations of selecting 'b' elements among 'a' elements. If the effective channel matrix reconstructed according to the effective streams is substituted in the channel capacity equation, the channel capacity equation is expressed in Equation 3 below:

$$C_{N_{T,eff}}(l) = \log_2\left(\det\left(I_{N_{T,eff}} + \frac{E_s}{N_{T,eff}\sigma_n^2}H_{N_{T,eff}}^H(l)H_{N_{T,eff}}(l)\right)\right) \quad (3)$$

Wherein, $E_s$ denotes the total sum of transmission power by antenna, $N_{T,eff}$ denotes the the number of effective streams, $\sigma_n^2$ denotes a noise power, $C_{N_{T,eff}}(l)$ denotes the channel capacity for $l^{th}$ stream combination among ${}_{N_T}C_{N_{T,eff}}$ stream combinations that can be comprised of $N_{T,eff}$ effective streams, and $H_{N_{T,eff}}(l)$ denotes the reconstructed effective channel matrix for $l^{th}$ stream combination among stream combinations of ${}_{N_T}C_{N_{T,eff}}$ number that can be comprised of $N_{T,eff}$ effective streams.

Equation 3 is the channel capacity equation if assuming that a transmission power per stream is the same. That is, the transmission power per stream of Equation 3 is expressed in Equation 4 below:

$$P_T = \frac{1}{\sqrt{N_{T,eff}}} I_{N_{T,eff}} \quad (4)$$

Wherein, $P_T$ denotes the power allocation matrix, and $N_{T,eff}$ denotes the the number of effective streams.

Unlike Equation 3, if the transmission power per stream is different, the channel capacity equation is expressed in Equation 5 below:

$$C_{N_{T,eff}}(l) = \log_2\left(\det\left(I_{N_{T,eff}} + \frac{E_s}{\sigma_n^2}P_T H_{N_{T,eff}}^H(l)H_{N_{T,eff}}(l)P_T\right)\right) \quad (5)$$

Wherein, $E_s$ denotes the total sum of transmission power by antenna, $N_{T,eff}$ denotes the number of effective streams, $\sigma_n^2$ denotes the noise power, $P_T$ denotes the power allocation matrix, $C_{N_{T,eff}}(l)$—denotes the channel capacity for $l^{th}$ stream combination among ${}_{N_T}C_{N_{T,eff}}$ stream combinations that can be comprised of $N_{T,eff}$ effective streams, and $H_{N_{T,eff}}(l)$ the reconstructed effective channel matrix for $l^{th}$ stream combination among ${}_{N_T}C_{N_{T,eff}}$ stream combinations that can be comprised of $N_{T,eff}$ effective streams.

If using Equation 3 or 5, channel capacities for all possible stream combinations are calculated. After that, an effective stream combination is decided by seeking the number of streams and a stream combination having the maximum channel capacity, that is, l having the maximum channel capacity. This is expressed in Equation 6 below:

$$(\hat{N}_{T,\text{eff}}, \hat{l}) = \arg\max_{N_{T,\text{eff}},l} C_{N_{T,\text{eff}}}(l) \qquad (6)$$

Wherein, $\hat{N}_{T,\text{eff}}$ denotes the decided the number of effective streams, $\hat{l}$ denotes the index of stream combination having maximum channel capacity, and $C_{N_{T,\text{eff}}}(l)$ denotes channel capacity for $l^{th}$ stream combination among ${}_{N_T}C_{N_{T,\text{eff}}}$ stream combinations that can be comprised of $N_{T,\text{eff}}$ effective streams.

In general, it has been known that an actual transmission rate between transmit and receive ends can achieve a channel capacity which is calculated by theoretical formula if the ML detection technique is used. Thus, the actual transmission rate is equal to a channel capacity obtained through Equation 3 or 5. A sum of channel capacities per effective stream is equal to the whole channel capacity obtained through Equation 3 or 5. This is expressed in Equation 7 below:

$$C_{\hat{N}_{T,\text{eff}}}(\hat{l}) \triangleq \sum_{m=1}^{\hat{N}_{T,\text{eff}}} \log_2(1 + SNR_{\text{eff}}(m)) \qquad (7)$$

Wherein, $C_{\hat{N}_{T,\text{eff}}}(\hat{l})$ denotes the channel capacity for effective stream combination when $l^{th}$ stream combination is effective stream, $\hat{N}_{T,\text{eff}}$ denotes the decided the number of effective streams, and $SNR_{\text{eff}}(m)$ denotes the signal to noise ratio of $m^{th}$ stream.

Equation 7 can be arranged in Equation 8 below:

$$\prod_{m=1}^{\hat{N}_{T,\text{eff}}} (1 + SNR_{\text{eff}}(m)) = \qquad (8)$$

$$\det\left(I_{\hat{N}_{T,\text{eff}}} + \frac{E_s}{\sigma_n^2} P_T H_{\hat{N}_{T,\text{eff}}}^H(\hat{l}) H_{\hat{N}_{T,\text{eff}}}(\hat{l}) P_T\right) \triangleq C'$$

Wherein, $\hat{N}_{T,\text{eff}}$ denotes the decided the number of effective streams, $SNR_{\text{eff}}(m)$ denotes the signal to noise ratio of $m^{th}$ stream, $E_s$ denotes the total sum of transmission power by antenna, $\sigma_n^2$ denotes the noise power, $P_T$ denotes the power allocation matrix, and $H_{\hat{N}_{T,\text{eff}}}(\hat{l})$ denotes the effective channel matrix that is reconstructed when $l^{th}$ stream combination is effective stream combination.

Equation 8 represents a relationship between the channel capacity equation of the ML detection technique and the effective SNR per stream. An effective SNR rate between the effective streams decided through Equation 6 is set in Equation 9 below:

$$\frac{SNR_{\text{eff}}(m)}{SNR_{\text{eff}}(n)} = \frac{f_{SNR}\left(M_{TX}(m), \rho, H_{\hat{N}_{T,\text{eff}}}(\hat{l}), \ldots\right)}{f_{SNR}\left(M_{TX}(n), \rho, H_{\hat{N}_{T,\text{eff}}}(\hat{l}), \ldots\right)} = \mu_{mn} \qquad (9)$$

Wherein, $SNR_{\text{eff}}(m)$ denotes the signal to noise ratio of $m^{th}$ stream, $f_{SNR}(\bullet)$ denotes the signal to noise ratio computation function, $M_{TX}(m)$ denotes the modulation order of $m^{th}$ stream, $\rho$ denotes the channel correlation, $H_{\hat{N}_{T,\text{eff}}}(\hat{l})$ denotes the effective channel matrix that is reconstructed when $l^{th}$ stream combination is effective stream combination, and $\mu_{mn}$ denotes the $SNR_{\text{eff}}(m)$ to $SNR_{\text{eff}}(n)$ rate.

As expressed in Equation 9, an effective SNR of each effective stream can be computed using a modulation order of each stream, a channel correlation, channel matrix information, etc. The effective SNR has a feature that it is proportional to each row vector norm of the effective channel matrix $H_{\hat{N}_{T,\text{eff}}}(\hat{l})$. Hence, a rate between the row vector norms represents a rate between the effective SNRs, although the row vector norm does not represent an explicit effective SNR. Thus, in one preferred embodiment of the present invention, if using the rate between the row vector norms of the effective channel matrix $H_{\hat{N}_{T,\text{eff}}}(\hat{l})$, the effective SNR rate between the effective streams of Equation 9 is calculated in Equation 10 below:

$$\frac{SNR_{\text{eff}}(m)}{SNR_{\text{eff}}(n)} = \mu_{mn} \approx \frac{\sum_{j=1}^{N_R} |h_{\hat{N}_{T,\text{eff}}}(j,m)|^2}{\sum_{j=1}^{N_R} |h_{\hat{N}_{T,\text{eff}}}(j,n)|^2} \qquad (10)$$

Wherein, $SNR_{\text{eff}}(m)$ denotes the signal to noise ratio of $m^{th}$ stream, $\mu_{mn}$ denotes the $SNR_{\text{eff}}(m)$ to $SNR_{\text{eff}}(n)$ rate, $N_R$ denotes the number of receive antennas, and $h_{\hat{N}_{T,\text{eff}}}(j,m)$ denotes the $(j,m)^{th}$ element of reconstructed effective channel matrix.

If Equation 10 is substituted in Equation 8, Equation 11 computing one specific effective SNR is obtained as below:

$$\prod_{n=1}^{\hat{N}_{T,\text{eff}}} \left(1 + \frac{SNR_{\text{eff}}(m)}{\mu_{mn}}\right) = C' \qquad (11)$$

Wherein, $\hat{N}_{T,\text{eff}}$ denotes the decided the number of effective streams, $\mu_{mn}$ denotes the $SNR_{\text{eff}}(m)$ to $SNR_{\text{eff}}(n)$ rate, $SNR_{\text{eff}}(m)$ denotes the signal to noise ratio of $m^{th}$ stream, and $C'$ denotes the channel capacity based on effective streams.

Equation 11 is an equation having as many orders as the decided the number of effective streams $\hat{N}_{T,\text{eff}}$. Thus, Equation 11 has maximum $\hat{N}_{T,\text{eff}}$ solutions. However, only one of the $\hat{N}_{T,\text{eff}}$ solutions has a positive real root. A proof of this is as follows.

Equation 11 is arranged in Equation 12 below:

$$q(x) = \prod_{n=1}^{\hat{N}_{T,\text{eff}}} \left(1 + \frac{x}{\mu_{mn}}\right) \qquad (12)$$

Wherein, $q(x)$ denotes the channel capacity equation, $\hat{N}_{T,\text{eff}}$ denotes the decided the number of effective streams, $x$ denotes the unknown quantity of $q(x)$, and $\mu_{mn}$ denotes the $SNR_{\text{eff}}(m)$ to $SNR_{\text{eff}}(n)$ rate.

Here, the rate $\mu_{mn}$ is greater than '0' and $C'$ is greater than or equal to '1'. This is decided by an SNR characteristic and a channel capacity characteristic. If $x_1$ and $x_2$ denote two solutions of Equation 12, when $x_2$ is greater than $x_1$ and $x_1$ is greater than '0', a relationship between them is established as in Equation 13 below:

$$\left(1 + \frac{x_2}{\mu_{mn}}\right) > \left(1 + \frac{x_1}{\mu_{mn}}\right) > 1 \quad (13)$$

$$q(x_2) - q(x_1) > 0$$

Wherein, q(x) denotes the channel capacity equation, and $\mu_{mn}$ denotes the $SNR_{eff}(m)$ to $SNR_{eff}(n)$ rate.

Thus, Equation 12 is a monotonically increasing function for x greater than '0'. Also, if x is equal to '1', q(x) is equal to '1'. Therefore, Equation 14 is established as follows.

$$q(x) = \prod_{n=1}^{\hat{N}_{T,eff}} \left(1 + \frac{x}{\mu_{mn}}\right) \geq 1, x \geq 0 \quad (14)$$

Wherein, q(x) denotes the channel capacity equation, $\hat{N}_{T,eff}$ denotes the decided the number of effective streams, x denotes the unknown quantity of q(x), and $\mu_{mn}$ denotes the $SNR_{eff}(m)$ to $SNR_{eff}(n)$ rate.

Accordingly, when x is greater than or equal to '0', C' and q(x) intersect at one point only. Therefore, Equation 11 has only one positive real root. That is, among solutions of Equation 11, a solution that is a positive real number is an effective SNR of a corresponding stream. Once an effective SNR for one stream is obtained, effective SNRs for remaining streams are calculated using Equation 9 in Equation 15 below:

$$SNR_{eff}(n) = \frac{SNR_{eff}(m)}{\mu_{mn}} \quad (15)$$

Wherein, $SNR_{eff}(m)$ denotes signal to noise ratio of $m^{th}$ stream, and $\mu_{mn}$ denotes $SNR_{eff}(m)$ to $SNR_{eff}(n)$ rate.

The effective SNRs per stream calculated through Equation 15 are decided as final effective SNRs through an error correction process of Equation 16 below:

$$SNR_{eff}^{Final}(m) = SNR_{eff}(m) + \xi \quad (16)$$

Wherein, $SNR_{eff}^{Final}(m)$ denotes final signal to noise ratio of $m^{th}$ stream, $NR_{eff}(m)$: signal to noise ratio of $m^{th}$ stream, $\mu_{mn}$ denotes $SNR_{eff}(m)$ to $SNR_{eff}(n)$ rate, and $\zeta$ denotes SNR correction value.

Construction and operation of a receive end deciding an effective SNR according to the aforementioned scheme according to a preferred embodiment of the present invention are described below in detail with reference to accompanying drawings.

FIG. 1 is a block diagram illustrating a construction of a receive end in a MIMO wireless communication system according to a preferred embodiment of the present invention.

As shown in FIG. 1, the receive end has a plurality of Radio Frequency (RF) processors 102-1 through 102-(N), a weight multiplier 104, a channel estimator 106, an ML detector 108, and an effective SNR generator 110.

The plurality of RF processors 102-1 to 102-(N) convert RF band signals received through corresponding antennas into baseband signals. The weight multiplier 104 multiplies a received signal vector by a weight matrix for receive beamforming. The channel estimator 106 estimates a channel using a predefined received signal, such as a pilot signal. The channel estimator 106 constructs an effective channel matrix taking into consideration a signal process of a transmit end performed for a transmitted signal vector and a signal process of the receive end performed for the received signal vector.

For example, the effective channel matrix can be formed by a multiplication of a transmit end weight matrix, a transmit end power allocation matrix, a channel matrix, and a receive end weight matrix as in Equation 1. The channel estimator 106 calculates and provides a mean noise power of the effective channel matrix and channel to the effective SNR generator 110.

The ML detector 108 estimates the transmitted signal vector from the received signal vector according to the ML detection technique. That is, the ML detector 108 estimates the transmitted signal vector through an operation of Equation 2. The effective SNR generator 110 generates an effective SNR per stream according to a preferred embodiment of the present invention. A detailed construction and operation of the effective SNR generator 110 are described below in detail with reference to FIG. 2.

Figure 2:
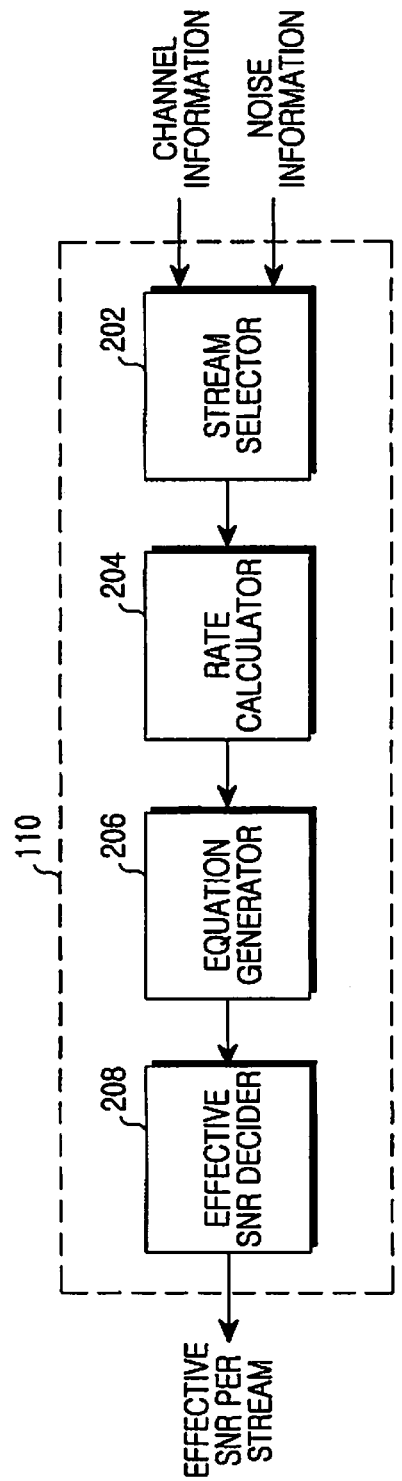
FIG. 2 is a block diagram illustrating a detailed construction of an effective Signal to Noise Ratio (SNR) generator in a MIMO wireless communication system according to a preferred embodiment of the present invention.

FIG. 2 is a block diagram illustrating a detailed construction of an effective SNR generator in a MIMO wireless communication system according to a preferred embodiment of the present invention.

As shown in FIG. 2, the effective SNR generator 110 includes a stream selector 202, a rate calculator 204, an equation generator 206, and an effective SNR decider 208.

The stream selector 202 selects an effective stream using a channel capacity equation. Selecting the effective stream is to select an the number and combination of effective streams. Specifically, the stream selector 202 selects an effective stream by calculating a channel capacity for each possible stream combination and seeking a stream combination having the maximum channel capacity. For example, if the number of whole streams is equal to '4', the stream selector 202 calculates a channel capacity for each of the possible $_4C_1 + _4C_2 + _4C_3 + _4C_4$ stream combinations by Equation 3 or 5 and selects an effective stream by Equation 6.

The rate calculator 204 calculates a relative SNR rate between the effective streams selected in the stream selector 202. For example, the rate calculator 204 can calculate the SNR rate between the streams by Equation 10, using a rate of each row vector norm of an effective channel matrix that is reconstructed according to the selected effective streams. For another example, the SNR rate between the streams can also be calculated using a modulation order per stream, a channel correlation, etc.

The equation generator 206 generates an equation having as a solution an SNR of one effective stream using the channel capacity and the SNR rate between the streams. For instance, the equation is the same as Equation 11. The channel capacity is obtained by substituting the effective stream selected in the stream selector 202 in Equation 3 or 5.

The effective SNR decider 208 calculates an effective SNR per stream, using both the equation generated in the equation generator 206 and the SNR rate between the streams. In other words, the effective SNR decider 208 calculates an SNR of one effective stream by obtaining a solution to the equation. The effective SNR decider 208 calculates SNRs of the remaining streams from the SNR of one effective stream using the SNR rate between the streams. After calculating the SNR per effective stream using the relative SNR rate, the effective SNR decider 208 corrects an error of the SNR per effective stream by Equation 16.

The effective SNR per stream generated through the aforementioned construction is fed back to a transmit end and is used for scheduling of the transmit end and decision of a Modulation and Coding Scheme (MCS) level of a transmitted signal. Thus, the receive end further includes a feedback transmitter (not shown) for transmitting feedback information to the transmit end. The feedback transmitter transmits information on the effective SNR per stream to the transmit end.

Figure 3:
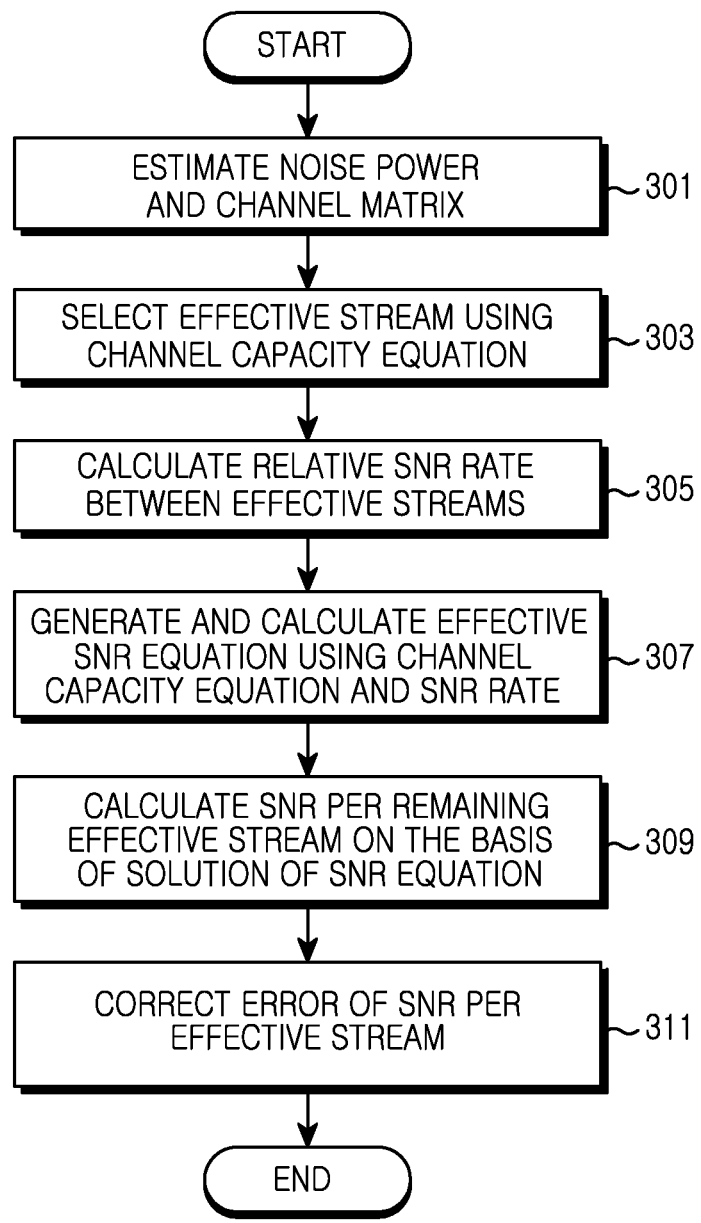
FIG. 3 is a flow diagram illustrating a process of deciding an effective SNR per stream in a receive end of a MIMO wireless communication system according to a preferred embodiment of the present invention.

FIG. 3 is a flow diagram illustrating a process of deciding an effective SNR per stream in a receive end of a MIMO wireless communication system according to a preferred embodiment of the present invention.

Referring to FIG. 3, in step 301, the receive end estimates an effective channel matrix with a transmit end using a predefined received signal and estimates a noise power. For example, the predefined received signal can be a pilot signal. The effective channel matrix represents a channel matrix between a transmitted signal vector and a received signal vector taking into consideration a signal process of the transmit end performed for the transmitted signal vector and a signal process of the receive end performed for the received signal vector. For example, the effective channel matrix can be formed by a multiplication of a transmit end weight matrix, a transmit end power allocation matrix, a channel matrix, and a receive end weight matrix as in Equation 1.

Then, the receive end selects an effective stream using a channel capacity equation in step 303. Selecting the effective stream is to select an the number and combination of effective streams. Specifically, the receive end selects the effective stream by calculating a channel capacity for each possible stream combination and a stream combination having the maximum channel capacity. For example, when the whole stream number is equal to '4', the receive end calculates a channel capacity for each of the possible $_4C_1+_4C_2+_4C_3+_4C_4$ stream combinations by Equation 3 or 5 and selects an effective stream by Equation 6.

After the effective stream is selected, the receive end calculates a relative SNR rate between the selected effective streams in step 305. For example, the receive end can calculate the SNR rate between the streams by Equation 10, using a rate of each row vector norm of an effective channel matrix that is reconstructed according to the selected effective stream. For another example, the SNR rate between the streams can be also calculated using a modulation order per stream, a channel correlation, etc.

After the SNR rate between the streams is calculated, in step 307, the receive end generates an equation having as a solution an SNR of one effective stream using the channel capacity and the SNR rate between the streams and obtains the solution of the equation. For instance, the equation is the same as Equation 11. The channel capacity is obtained by substituting the effective stream selected in the step 303 in Equation 3 or 5.

After the solution of the equation is obtained, that is, after the SNR of one effective stream is calculated, in step 309, the receive end calculates SNRs of the remaining streams from the SNR of one effective stream using the SNR rate between the streams.

Then, the receive end corrects an error of the SNR per effective stream by Equation 16 in step 311.

The effective SNR per stream generated through the aforementioned process is fed back to the transmit end and is used for scheduling of the transmit end and deciding of an MCS level of a transmitted signal. Thus, after the aforementioned process is performed, the receive end transmits information on the effective SNR per stream to the transmit end.

As described above, preferred embodiments of the present invention can maximize performance of a receive end implementing ML detection, by generating an effective SNR per stream through the use of an SNR equation that uses a channel capacity and an SNR rate between streams in a MIMO wireless communication system.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for a receiving end in a Multiple Input Multiple Output (MIMO) wireless communication system, the apparatus comprising:
    a selector for selecting a combination of effective streams among whole streams;
    a calculator for calculating ratios of Signal to Noise Ratio (SNR) between one effective stream in the selected combination to every other effective stream in the selected combination;
    a generator for generating a solution to an equation having the calculated ratios as input, the solution being an SNR of an effective stream in the selected combination of effective streams; and
    a decider for deciding an SNR for every effective stream in the selected combination using the solution of the equation and the calculated ratios.

2. The apparatus of claim 1, wherein the selector calculates a channel capacity for each of all possible stream combinations of the whole streams and selects a combination having a maximum channel capacity.

3. The apparatus of claim 1, wherein the calculator calculates the ratios using at least one of a modulation order per stream, a channel correlation, and an effective channel matrix.

4. The apparatus of claim 1, wherein the calculator calculates the ratios by calculating a rate of a norm value between row vectors of an effective channel matrix that is reconstructed according to the effective streams.

5. The apparatus of claim 1, wherein the generator generates the solution to the equation using a channel capacity based on the effective streams and the calculated ratios.

6. The apparatus of claim 1, wherein the generator generates the solution to the equation expressed below:

$$\prod_{n=1}^{\hat{N}_{T,\text{eff}}} \left(1 + \frac{SNR_{\text{eff}}(m)}{\mu_{mn}}\right) = C'$$

wherein $\hat{N}_{T,\text{eff}}$ denotes a decided number of effective streams, $\mu_{mn}$ denotes a ratio of $SNR_{\text{eff}}(m)$ to $SNR_{\text{eff}}(n)$, $SNR_{\text{eff}}(m)$ denotes signal to noise ratio of $m^{th}$ stream, and $C'$ denotes a channel capacity of the selected combination of effective streams.

7. The apparatus of claim 1, wherein the decider obtains the SNR of one effective stream from the solution of the equation and calculates SNRs of remaining effective streams in the selected combination from the SNR of the one effective stream using the ratios.

8. The apparatus of claim 7, wherein, after calculating the SNR for every effective stream using the ratios, the decider corrects an error of the SNR for every effective stream.

9. The apparatus of claim 1, further comprising: an estimator for estimating a channel with a transmit end using a received signal and constructing an effective channel matrix in consideration of a signal process of a transmit end performed for a transmitted signal vector and a signal process of a receive end performed for a received signal vector.

10. The apparatus of claim 1, further comprising: a transmitter for feeding back information on a final effective SNR per stream to a transmit end.

11. The apparatus of claim 1, further comprising: a detector for calculating a Euclidean distance between a received signal vector and each of all transmissible signal vectors and estimating a signal vector having a minimum Euclidean distance as a transmitted signal vector.

12. The apparatus of claim 1, wherein the equation represents a channel capacity of the selected combination of effective streams by using a constant, the SNR for the one effective stream and the ratios of the SNR between the one effective stream and the every other effective stream.

13. An operation method of a receive end in a Multiple Input Multiple Output (MIMO) wireless communication system, the method comprising:
  selecting a combination of effective streams among whole streams;
  calculating ratios of Signal to Noise Ratio (SNR) between one effective stream in the selected combination to every other effective stream in the selected combination;
  generating a solution to an equation having the calculated ratios as input, the solution being an SNR of an effective stream in the selected combination of effective streams; and
  deciding an SNR for every effective stream in the selected combination using the solution of the equation and the calculated ratios.

14. The method of claim 13, wherein selecting comprises:
  calculating a channel capacity for each of all possible stream combinations of the whole streams; and
  selecting a combination having a maximum channel capacity.

15. The method of claim 13, wherein the ratios are calculated using at least one of a modulation order per stream, a channel correlation, and an effective channel matrix.

16. The method of claim 13, wherein the ratios are calculated by a norm rate between row vectors of an effective channel matrix that is reconstructed according to the effective streams.

17. The method of claim 13, wherein the solution to the equation is generated using a channel capacity based on the effective streams and the at least one ratio.

18. The method of claim 17, wherein the equation is expressed below:

$$\prod_{n=1}^{\hat{N}_{T,eff}} \left(1 + \frac{SNR_{eff}(m)}{\mu_{mn}}\right) = C'$$

wherein $\hat{N}_{T,eff}$ denotes a decided number of effective streams, $\mu_{mn}$ denotes a ratio of $SNR_{eff}(m)$ to $SNR_{eff}(n)$, $SNR_{eff}(m)$ denotes signal to noise ratio of $m^{th}$ stream, and $C'$ denotes a channel capacity of the selected combination of effective streams.

19. The method of claim 13, wherein deciding comprises:
  obtaining an SNR of one effective stream from the solution of the equation; and
  calculating SNRs of remaining effective streams from the SNR of the one effective stream using the ratios.

20. The method of claim 19, further comprising:
  after calculating the SNR for every effective stream using the ratios, correcting an error of the SNR per effective stream.

21. The method of claim 13, further comprising:
  estimating a channel with a transmit end using a received signal; and
  constructing an effective channel matrix in consideration of a signal process of a transmit end performed for a transmitted signal vector and a signal process of a receive end performed for a received signal vector.

22. The method of claim 13, further comprising: feeding back information on a final effective SNR per stream to a transmit end.

23. The method of claim 13, further comprising: calculating a Euclidean distance between a received signal vector and each of all transmissible signal vectors and estimating a signal vector having a minimum Euclidean distance as a transmitted signal vector.

24. The method of claim 13, wherein the equation represents a channel capacity of the selected combination of effective streams by using a constant, the SNR for the one effective stream and the ratios of the SNR between the one effective stream and the every other effective stream.

* * * * *